Oct. 31, 1939.  R. H. DRAEGER  2,177,638
READING MACHINE
Filed Sept. 11, 1936  3 Sheets-Sheet 2
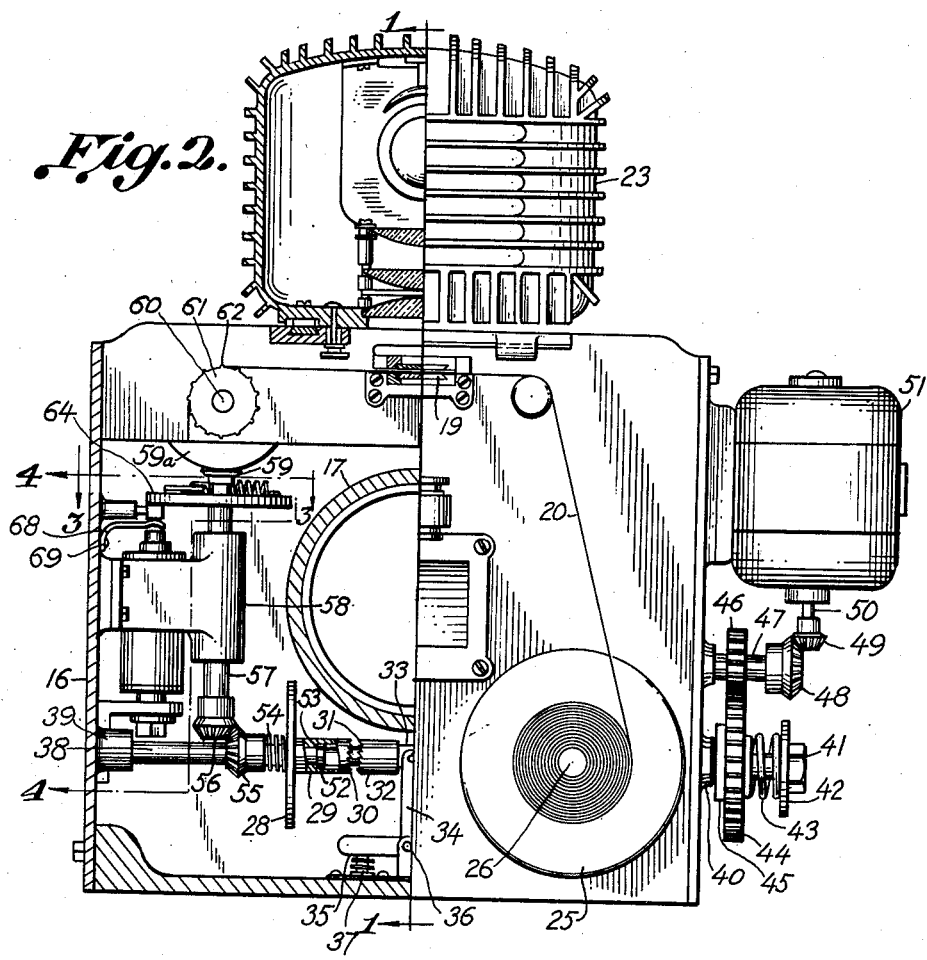

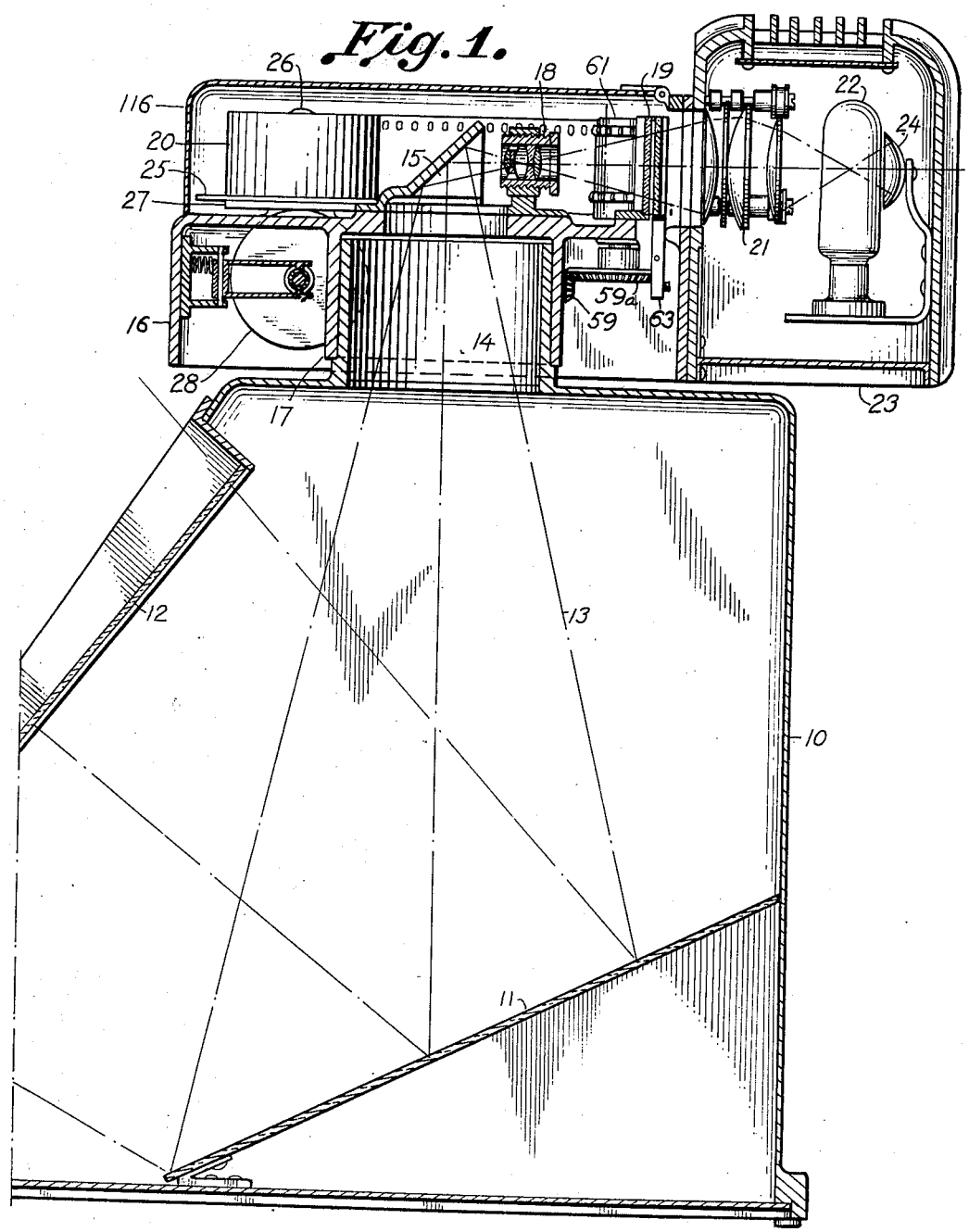

Oct. 31, 1939.     R. H. DRAEGER     2,177,638
READING MACHINE
Filed Sept. 11, 1936     3 Sheets-Sheet 3

INVENTOR.
Rupert H. Draeger.
BY
*Robert A. _____*
ATTORNEY

Patented Oct. 31, 1939

2,177,638

UNITED STATES PATENT OFFICE 2,177,638

READING MACHINE

Rupert H. Draeger, United States Navy

Application September 11, 1936, Serial No. 100,239

1 Claim. (Cl. 88—24)

(Granted under the act of March 3, 1883, as amended April 30, 1928; 370 O. G. 757)

This invention relates to apparatus for exhibiting material recorded on strip film and especially to a motor driven machine particularly adapted to exhibit reading matter recorded on relatively long strips of film, means being provided for readily shifting the film lengthwise in the machine for exhibiting at will any portion or portions thereof. The present invention is an improvement on the reading machine disclosed in my copending application, Serial Number 49,757, filed November 14, 1935 and which has become Patent No. 2,113,578, dated April 12, 1938.

In recent years there has been a definite development in the field of photographic copying and it has been found very practical to make film records or copies of various matter such as books, papers, drawings, documents, and similar objects. The film copies are produced photographically by recording, for instance, the consecutive pages of a book on consecutive portions of a long strip of film. The film copies produced are economical, easy to store, and durable. Much of this work is done with standard thirty-five millimeter film, the material copied being reduced to this size by suitable lenses in the camera. In order to examine and read film copies made on film of this size, it is necessary to provide a device to illuminate a portion of the film and project an enlarged image thereof to a screen on which it may be read. It is also necessary to provide for feeding or indexing the film strip so that the desired portion thereof is exhibited.

It is an object of this invention to provide a machine for exhibiting any desired portion or portions of a strip film record without delay and without extensive film manipulation.

It is an object of the invention to provide a reading machine having motor driven means to advance the film strip to the desired section thereof.

It is a further object of this invention to provide a machine of the class described which automatically advances the film strip one frame each time the reader operates a control key.

It is an object of this invention to provide a motor driven exhibiting machine which advances the film strip forwardly or backwardly rapidly in response to the operation of convenient controls.

It is an object of this invention to provide a reading machine which will rapidly rewind in proper direction on the original spool a strip of film which has been exhibited and examined.

It is an object of this invention to provide a reading machine of the class described which may be cross connected to a conventional business machine, such as an adding machine or a card coding machine, whereby the film strip is automatically indexed or advanced one frame when data on the film have been transferred to the business machine and tabulated, the automatic film indexing preventing accidental duplication in the operation of the business machine.

It is likewise an object of this invention to provide a reading machine which is foolproof in operation and economical to manufacture.

Other objects and advantages of the invention will be readily apparent from the following detailed description of the embodiment thereof shown in the accompanying drawings, wherein:

Figure 1 is a sectional elevation view of a machine embodying this invention.

Figure 2 is a plan view partly in section of the head of the machine shown in Figure 1.

Figure 3 is a sectional view on line 3—3 of Figure 2 showing the automatic mechanism for arresting the film advancing means when the film strip has been advanced one frame.

Figure 3a is a similar sectional view of the mechanism of Fig. 3 in film advancing position.

Figure 4 is a sectional view on line 4—4 of Figure 2 showing the release electro-magnet for the mechanism shown in Figures 3 and 3a.

Figure 5:
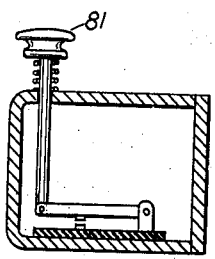
Figure 5 is a sectional view on line 5—5 of Figure 10 showing the continuous advance control key.

Referring to the drawings, for the purposes of illustration, the base housing of the reading machine is indicated by the numeral 10. The housing 10 is light-tight and may be made of sheet metal or the like. It is adapted to rest on a suitable table, desk or bench. A translucent screen 12, preferably of ground glass, is held in a frame in the front face of the housing 10. An upwardly extending neck or collar 14 is provided on the top side of the housing. A mirror or reflector 11 is supported within the housing 10 on suitable brackets, the angle of the mirror being such as to reflect light rays 13, entering the housing through the neck 14, onto the viewing screen 12, as shown in Figure 1.

The head member 16 of the machine is rotatably and removably mounted on and above the housing 10 by means of a collar 17 which may be integral with the head and which encircles the neck 14 of the housing. A lamp chamber 23 is secured to the rear side of the head member and is provided with a lamp 22, a reflector 24, and suitable openings to allow ventilation for cooling the same. A condensing lens assembly 21 is provided to concentrate and direct the light rays emanating from lamp 22 through a film gate 19 to a projecting lens 18 in the head of the machine. A reflector or reflecting prism 15 is provided directly over the housing neck 14 to direct light rays from the projecting lens 18 downward to the reflector 11. A pivoted cover 116 may be provided on the top of the head member 16 to enclose the mechanism therein. As thus far described, the construction is quite similar to that shown in my application referred to above.

The film strip or tape image 20 to be exhibited is wound on a half spool 25 supported on a spindle 26 in contact with a driving flange or wheel 27. The film strip 20 extends from the half spool 25 over a suitable guide and through the film gate 19 (see Figure 2). From the film gate 19, the film strip extends around a film sprocket 61 and then forward to a second half spool mounted on a spindle and having a driving flange or disc similar to those shown at 25 and 26.

An electric motor 51 is provided for driving the film sprocket 61 and the half spools 25 and may be attached to one side of the machine head as shown in Figure 2. The motor shaft 50 is provided with a bevel gear 49 to cooperate with and drive the gear 48 on shaft 47 journaled in the head member. The transverse shaft 38 is journaled in the head in bearings 39 and 40, the projecting end of the shaft being provided with a clutch disc 45 secured thereon. A gear 44 engaging a drive gear 46 mounted on shaft 47 is loosely arranged on shaft 38 and adapted to be forced into frictional engagement with the clutch disc 45 by means of spring 43 held on the end of shaft 38 by washer 42 and nut 41. Rotation of the motor shaft 50 produces rotation of shaft 38 in the machine head, clutch 45 permitting slippage when necessary.

The driven shaft 38 is provided with a clutch sleeve 32 having teeth 31. The sleeve 32 may be spirally splined to the shaft 38 so that it rotates therewith after shifting axially therealong. It is provided with a central groove 33 engaged by projections on the end of the T-shaped lever 34 for biasing the sleeve axially along the shaft 38 to the neutral position shown. The lever 34 is pivotally mounted at 36 and its opposite arms 35 are engaged by suitable springs 37 which tend to maintain the lever 34 and hence the clutch sleeve 32 in the central disengaged position shown in Figure 2. On either side of the clutch sleeve 32, there is provided a spool driving disc 28 mounted on a sleeve 29 having suitable teeth 30. The disc 28 and sleeve 29 are loosely mounted on the shaft 38, and internal shoulder 53 on sleeve 29 being urged into contact with a collar 52 on shaft 38 by means of the spring 54. The teeth 30 are such as to be engaged by the teeth 31 for driving the disc 28 when the clutch sleeve 32 is shifted axially upon rotation of shaft 38. Although the cut-away portion of Figure 2 shows only one spool-driving disc 28, there is a similar arrangement on the right-hand side of the head for driving the half-spool 25 when necessary.

The shaft 38 is also provided with a bevel gear 55 secured thereto and engaged by a gear 56 on shaft 57 journaled in bearing 58. The bracket supporting bearing 58 may be secured to the head by bolts. The shaft 57 is provided with a bevel gear 59 engaging a gear 59a on shaft 60 for driving the film sprocket 61. Conventional means may be provided at 63 for opening the film gate 19 while the film sprocket 61 feeds the film strip 20 therethrough.

Referring to Figures 3, 3a and 4, a stop disc 64 is rigidly secured to the shaft 57. The disc 64 is provided with a notch 65 adapted to be engaged by a catch 66 pivotally mounted at 67. A spring 68 fastened to the head casting at 69 urges the catch 66 into the notch 65. An electromagnet 70 is supported in the head casing 16 by bracket 71 so that its core is opposite the armature 73 secured to pivoted catch 66. The electromagnet is connected to be energized, when the driving motor 51 is energized, and draws the catch 66 out of the notch 65 to permit rotation of the stop disc 64. To prevent sudden stopping of disc 64 by catch 66, a centrifugally controlled dog 74 is pivotally secured on the stop disc at 75. A tension spring 76 tends to draw the free end of the dog 74 toward the center of the disc. The free end of the dog 74 moves outwardly by centrifugal action and moves a slidable element radially outward in notch 65 when disc 64 is being rotated at a high speed. The dog 74 may have a notch 77 engaged by the end 78 of spring 79 to determine the speed at which centrifugal action causes the dog to shift its position. Gears 59 and 59a are such that one rotation of the disc 64 causes the film sprocket 61 to advance the film strip 20 one frame.

Figure 6:
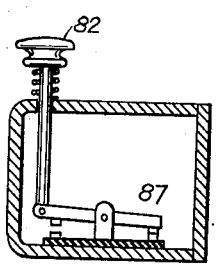
Figure 6 is a sectional view on line 6—6 of Figure 10 showing the continuous reverse control key.
Figure 7:
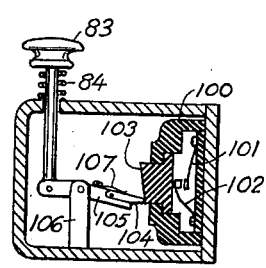
Figure 7 is a sectional view on line 7—7 of Figure 10 showing the single frame advance key.
Figure 8:
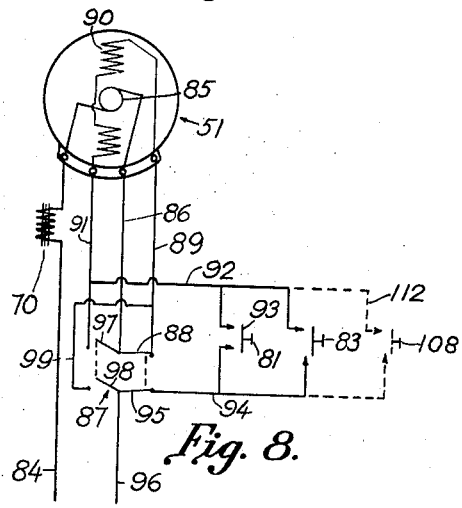
Figure 8 is a schematic wiring diagram of the electrical control circuits.

The electric driving motor 51 is of the reversible type and connected with the power supply, electromagnet, and control keys as shown in Figure 8. In the circuit shown, line 84 connects one power supply terminal to the motor armature 85 after passing through the electromagnet 70. The circuit then proceeds through line 86 to leg 88 of the double-pole double throw knife switch 87 which is controlled by the reverse key 82 shown in Figure 6. A spring engaging the reversing key 82 normally holds the switch 87 so that leg 88 is connected through line 89 to the field coil 90 of the motor 51. The other field winding terminal is connected through line 91 to a contact point of switch 87 and by line 92 to a contact of the continuous advance control key 83. The remaining power supply terminal is connected through line 96 to the leg 95 of switch 87 for connection either through cross line 99 to the motor field connection 89 or to line 94 to the continuous advance key 81 and the single frame advance key 83. The latter key, as shown in Figure 7, comprises a pair of spring mounted contacts 101 and 102 in a case 100, the contact adapted to be engaged by movement of the cam button 103 thereagainst. The cam button 103 is operated by a pivoted dog 104 on the lever 105, this lever being pivotally mounted at 106. A spring 107 on the lever 105 tends to hold the dog 104 in the position shown. Movement of the single advance control key 83 downward causes the dog 104 to press the cam button 103 inward to close the contacts 101 and 102. As the dog 104 passes beyond the cam button 103, the button moves outwardly and the circuit is immediately broken even if the control key is held depressed. Release of the key 83 permits spring 84 to raise it and pivoted dog 104 passes by the cam button 103 to the position shown without again closing the circuit. It will, therefore, be apparent that the circuit is closed and opened once each time the control key 83 is depressed. The motor will be energized by the closing of the circuit and the momentum of the motor is sufficient to carry the device over, so that the stop disc 64 will make one full revolution when the catch 66 will engage the notch 65 in the disc, thereby stopping the device after one frame of the film 20 has passed the film gate 19.

Figure 9:
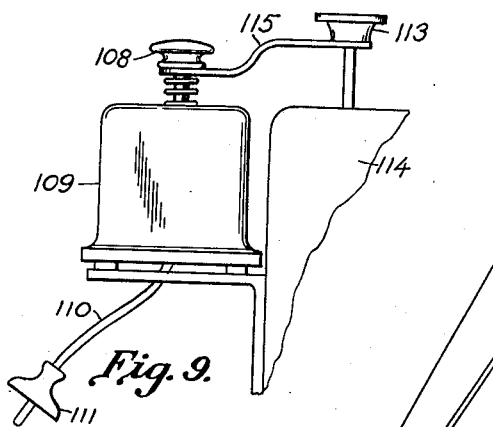
Figure 9 is an elevation view of a detachable single frame advance control key mounted to cooperate with the operating key of a conventional business machine.
Figure 10:
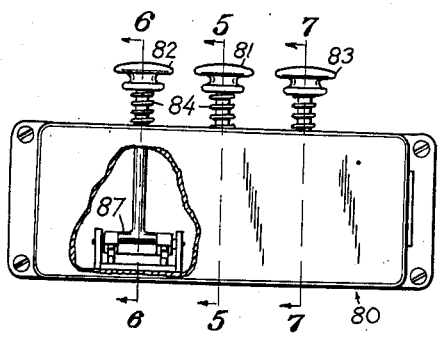
Figure 10 is a front elevation view, partly broken away, of the control key assembly.
Figure 11:
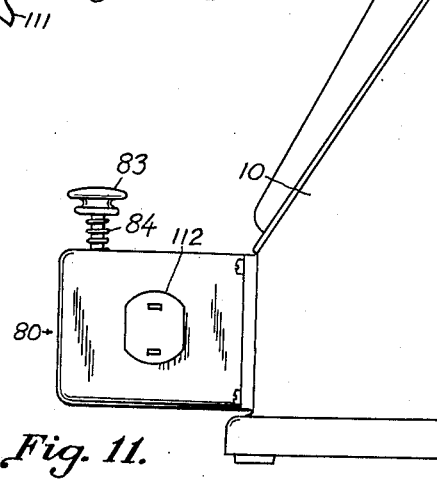
Figure 11 is an end elevation view of the control key assembly mounted on the front of the exhibiting machine shown in Figure 1.

The control keys 81, 82 and 83 may be mounted in a control box 80 adapted to be secured to the front face of the light-tight housing 10 as shown in Figure 11. Circuit lines 92 and 94 may be extended to a suitable plug socket 112 in the end of the control box 80. A control switch 109, similar to that shown in Figure 7, may be secured to a conventional business machine 114 as shown in Figure 9. Here the control key 108 is connected by an arm 115 to the tabulator or similar key 113 of the business machine and the switch terminals are connected, through the insulated cable 110, to the plug 111, which is adapted to engage socket 112 on the exhibiting machine control box. Hence each time data are tabulated on the business machine 114 by operation of the button 113 control key 108 is automatically operated to cause operation of the exhibiting machine drive so as to advance the film strip 20 one frame. The method of operation of the machine shown and described is as follows: The operator raises the cover 116 and places a half spool containing the film strip to be examined on the spindle 26. The end of the film is threaded around the film sprocket 61 so that the sprocket points 62 engage the openings in the film edges. The film is then passed through the film gate 19 and hence to another half spool on a second spindle 26. The cover 116 may then be lowered and the lamp 22 turned on. The operator then depresses the continuous advance control key 81 which closes the circuit including the power supply, the electromagnet 70, and the motor 51. When the magnet 70 is energized it attracts the armature 73 and thereby draws the catch 66 out of notch 65 permitting the motor 51 to drive the disc 64 and the film sprocket 61 for advancing the film strip as long as this control key is held down. Release of the key opens the circuit and deenergizes the motor and magnet. The catch 68 is then free to enter the notch 65 to stop the disc 64 as soon as the speed of rotation of the disc has decreased enough to permit spring 76 to draw dog 74 and its sliding element away from the notch 65. This arrangement prevents sudden stopping of the disc 64 the instant the circuit is broken and therefore avoids a sudden jerk which might damage the film strip. As the motor drives the film sprocket 61 it also drives one or the other of the frictional discs 28 which engage the half-spool supports for winding the same. The clutch sleeve 32 is fed axially by the spiral on the driven shaft 38 in one direction or the other to engage the proper sleeve teeth 30 for driving the proper spool drive, depending on which way the driven shaft 38 is rotated. After the operator has advanced the film strip to that portion of the strip which he desired to examine, he operates the single frame advance key 83 or 108 to move the film strip forward one frame each time the key is depressed. Each time the contacts 101 and 102 are closed and opened, the magnet 70 draws the catch 66 away from notch 65 permitting the motor 51 to drive the disc 64 one turn. One turn of disc 64 turns the film sprocket 61 so as to advance the film strip one frame exactly.

When it is desired to advance the film in the reverse direction for rewinding or for reexamining a portion of the film strip, the reverse control key 82 is depressed. This reverses the connections to the motor 51 causing it to rotate in the reverse direction to feed the film strip back onto its original spool. As the shaft 38 is driven in the reverse direction, its spiral causes the clutch sleeve 32 to be shifted into engagement with the clutch of the frictional disc 28 which operates the original half spool for rewinding the film strip. The catch mechanism 66 is such as to be operative in either direction of film feeding so that the film strip may be driven backward or forward one frame at a time as desired.

When it is desired to automatically operate the exhibiting machine in conjunction with the operation of a business machine, the mechanism shown in Figure 9 may be used. When the operator has tabulated the data exhibited by one frame of the film in the reading machine, he operates the business machine control, such as a totalizer key 113, and automatically advances the film strip one frame in the exhibiting machine by means of the remote control described.

It will be apparent from the above description of the embodiment of my invention illustrated, that I have provided a strip film reading machine which is most useful in the examination of film copies of all kinds of books, drawings, documents, and the like. The image is projected onto a convenient screen and rotatable mounting of the head 16 permits the head to be shifted through an angle of ninety degrees to facilitate examination of copy which is crosswise rather than lengthwise on the film strip. The described arrangement of motor drive for shifting the film as desired greatly facilitates speedy exhibition of the desired portions of a film strip, the film being at all times under the precise control of the examiner.

My invention also contemplates numerous modifications and variations in the structure described, as it will be readily apparent to one skilled in the art that many such changes may be made without departing from the scope of the invention as defined in the appended claim.

The invention described herein may be manufactured and used by or for the Government of the United States of America for governmental purposes without the payment of any royalties thereon or therefor.

What I claim is:

In a reading machine, in combination, an enclosed supporting base portion carrying a translucent screen in one wall thereof, a series of control keys mounted on the base portion in convenient reach of the operator's hand while viewing the screen; an upstanding hollow neck section on the top wall of the base portion; a projection head section rotatably mounted on said hollow neck section, said projection head carrying film reels, a film gate, a reflection means, a projection objective, film sprockets, a condenser lens system and a light source in operative relationship as to project images from the film at the film gate through the hollow neck section upon the screen; motor means and associated clutch means mounted on the projection head to selectively drive the film sprockets to move the film and means operatively connecting the motor and said control keys whereby an operator by operating said keys may move the film past the film gate to project from any portion thereof as desired.

RUPERT H. DRAEGER.